(12) United States Patent
Ji et al.

(10) Patent No.: US 8,591,089 B2
(45) Date of Patent: Nov. 26, 2013

(54) PORTABLE COMPUTER ILLUMINATION

(75) Inventors: Gang Ji, Kanagawa-ken (JP); Moriyuki Tsuchihashi, Kanagawa-ken (JP); Hidenori Kinoshita, Tokyo (JP); Hiroyuki Noguchi, Kanagawa-ken (JP); Fumitake Mizoguchi, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 59 days.

(21) Appl. No.: 13/327,964

(22) Filed: Dec. 16, 2011

(65) Prior Publication Data

US 2012/0155112 A1 Jun. 21, 2012

(30) Foreign Application Priority Data

Dec. 21, 2010 (JP) ................................. 2010-284069

(51) Int. Cl.
*F21V 8/00* (2006.01)

(52) U.S. Cl.
USPC ............................ 362/602; 362/628; 362/560

(58) Field of Classification Search
USPC ........................................ 362/602, 628, 560
See application file for complete search history.

(56) References Cited

U.S. PATENT DOCUMENTS 6,776,497 B1 * 8/2004 Huppi et al. .................... 362/85

FOREIGN PATENT DOCUMENTS

| JP | 08-17209 | 1/1996 |
| JP | 2001-022470 | 1/2001 |
| JP | 2001-229703 | 8/2001 |

* cited by examiner

*Primary Examiner* — David V Bruce
(74) *Attorney, Agent, or Firm* — Ference & Associates LLC

(57) ABSTRACT

Described is an illumination structure suitable for a keyboard light of a portable computer. An example illumination structure includes a transparent acrylic board, a light source, and a light guide. The acrylic board may have a front surface and a rear surface, each of which is flat. The light source is provided at a tilt angle q at which an optical axis is almost at a critical angle with respect to the rear surface of the acrylic board. The light guide is located between the light source and the rear surface. Further, light rays radiated from the light source are refracted by the light guide and the optically-transparent panel, and travel towards the front surface, so as to illuminate the surface.

20 Claims, 12 Drawing Sheets

PORTABLE COMPUTER ILLUMINATION

CLAIM FOR PRIORITY

This application claims priority from Japanese Application No. 2010-284069, filed on Dec. 21, 2010, and which is fully incorporated by reference as if fully set forth herein.

FIELD OF THE INVENTION

The subject matter described herein relates generally to an illumination structure for providing illumination from a flat front surface toward the front surface. More specifically, subject matter described herein relates to an illumination structure that is applicable to a keyboard light of a flat design portable computer.

BACKGROUND

Japanese Patent Application Laid-Open No. 2001-22470 discloses a notebook-type personal computer (hereinafter referred to as a laptop PC) provided with an illumination device (keyboard light) that irradiates a surface of a keyboard. The illumination device is realized by an LED holder in which an LED is housed. An upper edge of a display device extends like eaves with respect to a front surface of the display device, and the illumination device is attached to the upper edge. This configuration allows light rays from the LED holder to irradiate the keyboard below the LED holder.

In recent portable computers, a system which is a so-called flat design and in which a front surface of a peripheral margin of a display device and a front surface of the display device are located on the same plane has become adopted. In this case, since there is no structure such as eaves on the front surface of the display device, a keyboard light having a structure like that disclosed in Japanese Patent Application Laid-Open No. 2001-22470 cannot be adopted. Further, such a method in which an LED holder is supported by a spring structure so that the LED holder is sprung out of the inside of a housing and pushed back into the housing according to opening and closing of a cover of a laptop PC can be considered. However, the method is not preferable because the number of parts increases and an opening is formed on the front surface.

JP Patent No. 3982174 discloses a light irradiation apparatus constituted by a light source and a light guide plate. The light guide plate is configured so that a light ray that is incident from the light source is multiply reflected and emitted from between a perpendicular direction and a horizontal direction with respect to a bottom surface.

Japanese Patent Application Laid-Open No. 8-17209 discloses an illumination device embedded in a wall surface so as to illuminate a floor. The illumination device of Japanese Patent Application Laid-Open No. 8-17209 is configured so that when light emitted from a fluorescent lamp travels while repeating total reflection inside a cuneate light guide, the light gradually goes obliquely downward as it crosses over a critical angle. Further, Japanese Patent Application Laid-Open No. 8-17209 discloses that emission light is emitted at an output angle of 65 degrees±10 degrees to the normal line to the wall surface.

In the method of Japanese Patent Application Laid-Open No. 8-17209, a long light guide is necessary to use the repetition of the total reflection. However, such a long light guide is not suitable for mounting around a display. Further, light rays having large output angles (refraction angles), which can irradiate the area of the keyboard near the display, are not included. In view of this, the principle of Japanese Patent Application Laid-Open No. 8-17209 cannot be applied to the keyboard light. In a case where the light guide plate described in U.S. Pat. No. 3,982,174 is placed upside down to be used for the keyboard light, the light guide plate requires a length to allow multiple reflections between a front surface F and a rear surface R, and further, light rays having large output angles that can fully illuminate the keyboard, are not included. Thus, this light guide plate is also not suitable for the keyboard light for the same reason as Japanese Patent Application Laid-Open No. 8-17209.

BRIEF SUMMARY

In summary, one aspect provides an apparatus comprising: an upper housing having a display screen and an illumination structure therein; and a lower housing attached to said upper housing and having information handling device components therein; said illumination structure comprising: a light source; and a flat optically-transparent panel structure; wherein said light source is positioned to provide light rays to said flat optically-transparent panel structure such that said light rays are refracted and emit from said flat optically-transparent panel structure onto a surface of said lower housing.

An additional aspect provides an apparatus comprising: an illumination structure configured for integration within an upper housing of an information handling device; said illumination structure comprising: a light source; and a flat optically-transparent panel structure; wherein said light source is positioned to provide light rays to said flat optically-transparent panel structure such that said light rays are refracted and emit from said flat optically-transparent panel structure onto a surface of a lower housing of said information handling device.

Furthermore, another aspect provides a method comprising: providing a flat optically-transparent panel structure in an upper housing of an information handling device; and providing a light source which is set so to provide light rays to a rear surface of the optically-transparent panel structure; wherein, said providing a flat optically-transparent panel structure and said providing a light source steps include arranging said light source and said flat optically-transparent panel structure such that light rays emitted from said light source are refracted and emitted from said flat optically-transparent panel structure onto a surface of a lower housing of said information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1A:
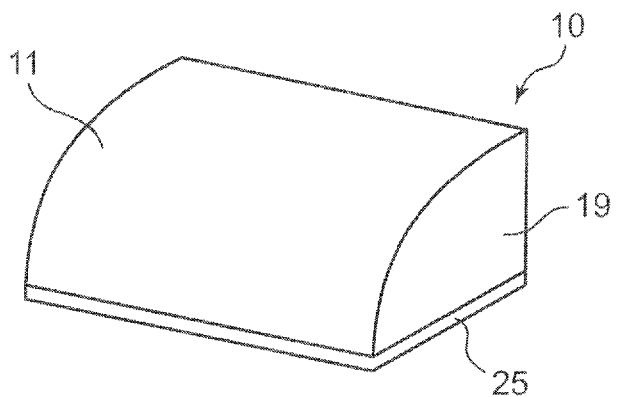
FIGS. 1A-1C are views illustrating a light assembly applied to an illumination structure.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The remainder of the disclosure begins with a general overview and proceeds to give a more detailed description of example embodiments with reference to the accompanying figures. A description of the symbols used throughout this disclosure is also provided near the end of this disclosure for ease of reference.

In view of the above described conventional arrangements, an embodiment provides an illumination structure which can achieve illumination by refracting light rays from a flat front surface back towards the surface. Further another embodiment provides an illumination structure which can achieve illumination of uniform illumination while compensating for a reduction of that optical transmittance in an optically-transparent panel which changes depending on an incidence angle. Further another embodiment provides an illumination structure suitable for a keyboard light of a portable computer. Further another embodiment provides a portable computer which employs such an illumination structure and an illumination method which uses such an illumination structure.

Embodiments provide an illumination structure for radiating light rays from a flat front surface in a direction towards the front surface. The illumination structure is constituted by an optically-transparent panel, a light source, and a light guide. The optically-transparent panel and the light guide can be formed from materials whose refractive indexes are approximately equal to each other. The optically-transparent panel has a front surface and a rear surface, each of which is flat. The light source is provided at a tilt angle at which an optical axis is almost at a critical angle with respect to the rear surface of the optically-transparent panel. The light guide is provided between the light source and the rear surface. Further, light rays radiated from the light source are refracted by passing through the light guide and the optically-transparent panel, and travel towards the front surface of the optically-transparent panel.

When an irradiated surface that is perpendicular to the optically-transparent panel is provided, the light rays traveling towards the front surface can illuminate an area on the irradiated surface near the optically-transparent panel. When the tilt angle is in a range from the critical angle of light incident on the optically-transparent panel to an angle larger than the critical angle by 3 degrees, light radiated from a flat radiation plane that areally spreads can be utilized effectively. The light guide has an incidence plane on which light of the light source is incident, and an emission surface provided at a position opposed to the incidence plane, and can be configured such that a part of the light rays that have been incident on the emission surface are refracted at the largest refraction angle so as to be incident on the optically-transparent panel.

A light ray emitted from the light guide at the largest refraction angle is emitted at a large refraction angle even from the front surface of the optically-transparent panel. The refraction angle at that time can be set in a range from 60 degrees up to the largest refraction angle. The light guide can be configured to include a flat bottom surface contacting the incidence plane and the emission surface providing a mounting surface, and a reflecting surface contacting the incidence plane and the emission surface, which is at a position opposed to the bottom surface, and whose cross section on a plane including the optical axis and perpendicular to the bottom surface is formed in a curve. The reflecting surface can cause light rays directly incident thereon from the light source to be totally reflected so as to be incident on the emission surface. The emission surface can be formed so that its cross section is in a cubic curve or an arc.

The light guide can be configured such that a light ray traveling over the optical axis of the light source is incident at a nearest position on the curve of the emission surface which is nearest to the rear surface. Further, the nearest position on the emission surface and the rear surface may be distanced, but in order not to cause that position on the optically-transparent panel from which light is emitted to shift with respect to the position of the light guide, it is desirable that they have contact with each other. The light guide can include an absorber layer affixed to the bottom surface, which limits total reflection on the bottom surface, and which absorbs light incident thereon. As a result, minimal light rays travel forward (a normal line direction) of the optically-transparent panel, thus, when the illumination structure is used for a keyboard light, the user is not exposed to glare. The absorber layer can be formed by applying black ink to the bottom surface by screen printing.

Embodiments also describe a method for providing illumination of uniform illuminance while compensating for a reduction of optical transmittance which varies depending on an incidence angle, when a light ray passes through an optically-transparent panel. First, a light source is provided at a tilt angle at which an optical axis is almost at a critical angle with respect to a rear surface of the optically-transparent panel. Then, light rays radiated from the light source are emitted from a light guide by refracting the light rays at refraction angles within a predetermined range up to the largest refraction angle so that a density of light rays decreases as the refraction angle is smaller. Finally, the light rays emitted from the light guide are emitted from a front surface of the optically-transparent panel by causing the light rays to be incident via a rear surface of the optically-transparent panel and refracting the light rays at the refraction angles within the predetermined range from the largest refraction angle. In the light rays emitted from the light guide, a light-ray group of large refraction angles has a high density of light rays. In the meantime, the optical transmittance is smaller as a light ray has a larger incidence angle in the optically-transparent panel. Accordingly, they are compensated, thereby resulting in uniform illuminance on the irradiated surface.

Embodiments provide an illumination structure which can achieve illumination by refracting light rays from a flat front surface toward directions near the front surface. Further, in accordance with other aspects, it is possible to provide an illumination structure which can achieve uniform illuminance while compensating for a reduction of that optical transmittance in an optically-transparent panel which changes depending on an incidence angle. Further, in accordance with embodiments, it is possible to provide an illumination structure suitable for a portable computer keyboard light. Moreover, in accordance with embodiments, it is possible to provide a portable computer which employs such an illumination structure and an illumination method which uses such an illumination structure.

Figure 1B:
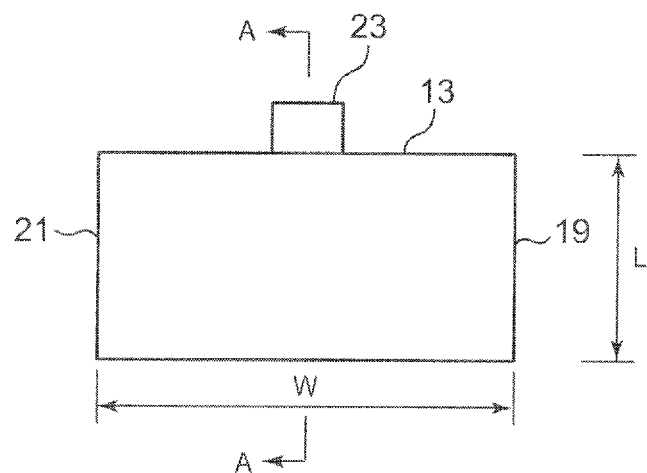
Figure 1C:
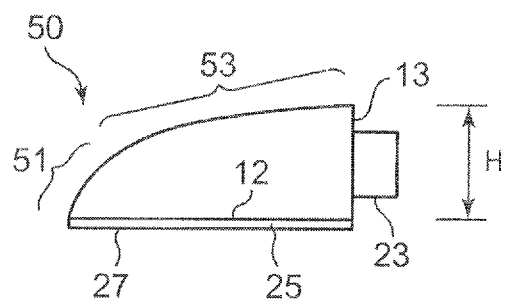

Referring now to the figures, FIG. 1 is a view illustrating a light assembly applied to an illumination structure according to an embodiment. FIG. 1A is a perspective view of a front of a light assembly 10 viewed from obliquely upward, FIG. 1B is a plane view of the light assembly 10 viewed from the top, and FIG. 1C is a cross-sectional view taken from arrows A-A of FIG. 1B, in which view the light assembly 10 is cross-sectioned on a plane which includes an optical axis of a light source 23, which is at a center of the light assembly 10 in a direction of a width W, and which is perpendicular to a bottom surface. A light guide 11 has the shape in FIG. 1C, even if it is cut by any positions on a plane parallel to the cross section along the arrows A-A.

The light guide 11 is formed integrally by using, as a material, acrylic (PMMA) resin having a high light transmittance by a method such as compression molding or injection molding. The light guide 11 includes an incidence plane 13, a bottom surface 12, a counter surface 50, and side surfaces 19 and 21. The incidence plane 13 and the side surfaces 19 and 21 are planes which are perpendicular to the bottom surface 12. The light guide 11 is, in one non-limiting example, 12 mm in width W, 6 mm in length L, and 2.5 mm in height H. A shape of a cross section of the counter surface 50 can be formed by adopting a cubic curve, combining arcs having a predetermined radius and central angle, or further combining a straight line with them.

As a light source 23, a light-emitting diode is employed in one non-limiting example. A radiation plane of the light source 23 is configured, for example, such that a light ray is radiated from the radiation plane of 2 mm in diameter via its center in a conical manner at an angle of 60 degrees to an optical axis which is perpendicular to the radiation plane. Light radiated from the light source 23 comes into the light guide 11 through the incidence plane 13. In the counter surface 50, an area opposed to the incidence plane 13 is called a headmost portion. In the counter surface 50, the headmost portion can be defined as an emission surface 51, and an area between the emission surface 51 and the incidence plane 13 can be defined as a reflecting surface 53. The emission surface 51 is an area where the light radiated from the light source 23 is emitted into the air from the light guide 11.

In the light incident from the incidence plane 13, a light ray which is not totally reflected even once internally, and a light ray which is totally reflected once on the reflecting surface 53 is incident on the emission surface 51. The light ray which is incident on the counter surface 50 without totally reflecting inside the light guide 11 is called a direct ray, and the light ray which is totally reflected once or a plurality of times on the counter surface 50 and then is incident on the emission surface 51 is called a reflected ray. Hereinafter, first total reflection is called primary total reflection, and total reflection of a light ray that undergoes the primary total reflection is called secondary total reflection. In the direct rays and the reflected rays, a light ray that is incident on the counter surface 50 at an incidence angle smaller than a critical angle passes through the counter surface 50 and is emitted into the air, and a light ray that is incident on the counter surface 50 at an incidence angle larger than the critical angle is totally reflected.

In view of this, when the emission surface 51 is defined as an area of the light guide from which light from the light source 23 is emitted, the range thereof varies depending on a light ray to be incident. In the present specification, that area of the counter surface 50 which is at the headmost portion of the light guide 11 and from which either of the direct rays and the reflected rays radiated from the light source 23 are emitted is defined as the emission surface 51. In the present specification, the explanation about the behavior of scattered light occurring inside the light guide 11 is omitted because it is not necessary.

On the bottom surface 12 of the light guide 11 is provided an absorber layer 25 affixed thereto so that no air space is formed between the absorber layer 25 and the bottom surface 12. A bottom surface 27 of the absorber layer 25 corresponds to a bottom surface of the light assembly 10, and provides a mounting surface for the light assembly. The absorber layer 25 is made of a material having a refractive index approximate to that of acrylic so that incident light is not totally reflected on the bottom surface 12 of the light guide 11. Thus, light incident on the bottom surface 12 at an incidence angle larger than the critical angle is incident on the absorber layer 25 without total reflection.

In the present embodiment, with the use of a black translucent material for the absorber layer 25, incident light that is incident on the absorber layer 25 is absorbed, thereby preventing it from becoming incident on the counter surface 50 via total reflection on a boundary between the bottom surface 27 of the absorber layer 25 and the air or an attachment material. In one non-limiting example, the absorber layer 25 can be formed by applying black ink to the bottom surface 12 of the light guide 11 by screen printing. However, If the following three conditions can be met, that is, no air space is formed between the bottom surface 12 and the absorber layer 25, the incident light can be absorbed effectively, and the refractive index is approximate to that of acrylic, the absorber layer 25 can be formed by other materials molded by use of materials in two colors of black resin and transparent resin or by other methods.

Refraction Angle and Reflection Angle

Figure 2A:
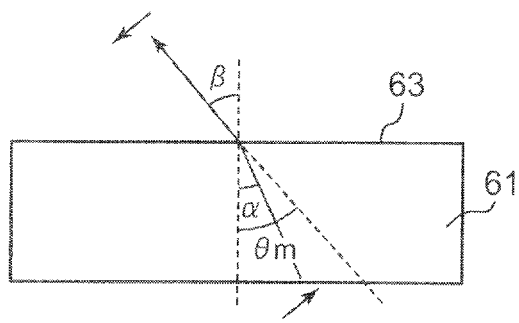
FIGS. 2A-2C are views illustrating the behavior of a light ray on a boundary surface between air and acrylic.
Figure 2B:
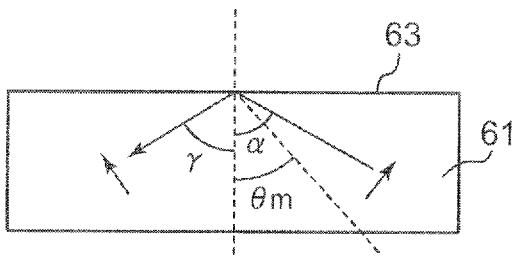
Figure 2C:
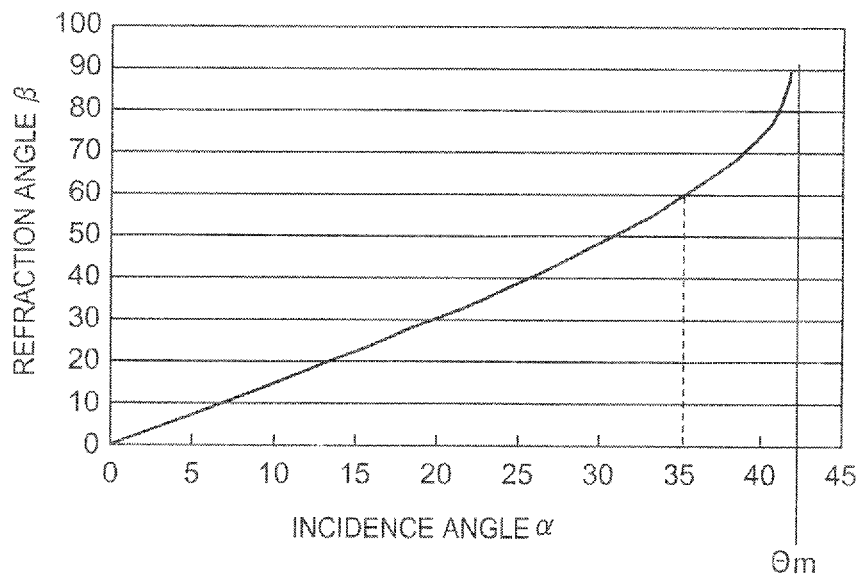

FIG. 2 is a view illustrating the behavior of a light ray in an acrylic board having contact with the air. The refractive index of an acrylic board 61 is about 1.5, and the refractive index of the air is 1. In this case, in accordance with Snell's law, the critical angle θm of a light ray that is incident on a boundary 63 between the acrylic board 61 and the air from the inside of the acrylic board 61 is 42 degrees. FIG. 2A shows how a light ray of which an incidence angle α is changed from 0 degrees to the critical angle θm is incident on the acrylic board 61. While the incidence angle α is less than the critical angle θm, an incident ray is emitted into the air from the acrylic board 61 at a refraction angle β (β>αa). A relation between the incidence angle α and the refraction angle β at this time is shown in FIG. 2C.

From FIG. 2C, it is demonstrated that the refraction angle β increases almost in proportion to the incidence angle α when the incidence angle α is about 35 degrees or less, but when the incidence angle α is beyond 35 degrees (corresponding to a refraction angle of 60 degrees), the refraction angle β increases at a higher rate than the increasing rate of the incidence angle, and the refraction angle β rapidly increases as the incidence angle is closer to the critical angle θm. The refraction angle β is the largest right before the incidence angle α reaches the critical angle θm. The incidence angle at this time is called a largest transmissive incidence angle and the refraction angle at this time is called a largest refraction angle.

In the after-mentioned illumination structure of the present embodiment, a direction of the optical axis of the light source 23, a shape of the emission surface 51, a shape of the reflecting surface 53, and the like are determined so that as many light rays as possible can be incident on the emission surface 51 at incidence angle α in the range of 35 degrees≤α≤θ at respective incident positions. FIG. 2B shows one non-limiting example in which a light ray to be incident at an incidence angle α beyond the critical angle θm is totally reflected on the boundary 63 at a reflection angle γ. When the light ray is totally reflected, it travels so that the incidence angle α is identical with the reflection angle γ.

Incidence Angle of Parallel Rays to Counter Surface

Figure 3A:
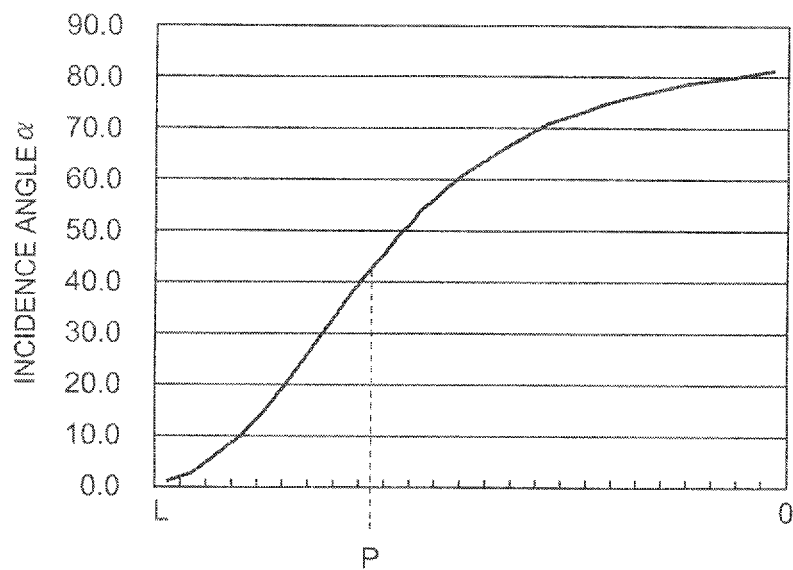
FIGS. 3A-3B are views showing an incidence angle for each position when parallel rays irradiated to an incidence plane are incident on a counter surface.
Figure 3B:
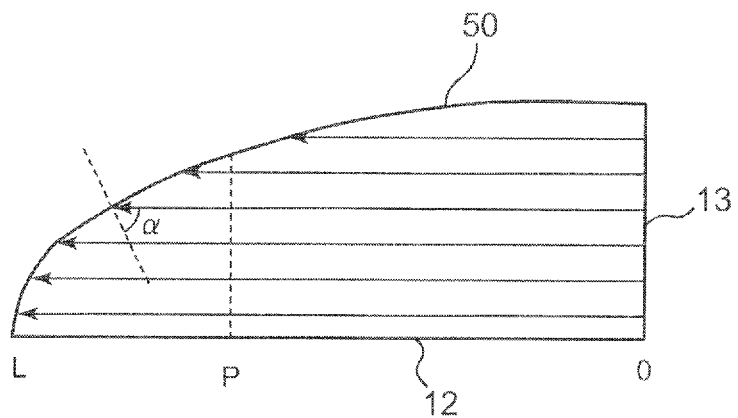

FIG. 3 is a view showing the incidence angle α for each position on the counter surface 50 corresponding to the bottom surface 12 when parallel rays are incident on the counter surface 50. This assumes a case where a surface light source that radiates parallel rays over the whole incidence plane 13 is provided. The following description deals with one non-limiting example in which the whole counter surface 50 is formed in a cubic curve. The incidence angle α to the counter surface 50 decreases as the position on the counter surface 50 is away from the incidence plane 13, and reaches the critical angle θm at a position corresponding to a length P on the bottom surface 12, which is measured from a side of the incidence plane 13. Further, the incidence angle α decreases as the position approaches forward, and the incidence angle α is zero at a position of a length L on the bottom surface 12, which position corresponds to a headmost part of the counter surface 50. In view of this, the counter surface 50 functions to totally reflect the light ray which is parallel to the bottom surface 12 up to the position corresponding to the length P of the bottom surface, and to pass the light ray therethrough between the position corresponding to the length P and the position corresponding to the length L.

Therefore, the counter surface 50 for the light ray which is parallel to the bottom surface 12 serves as the reflecting surface 53 between a position corresponding to a length of 0 and the position corresponding to the length P, while serving as the emission surface 51 between the position corresponding to the length P and the position corresponding to the length L. The above description deals with the example of the cubic curve. However, as shown in the figure, in a case of a continuing curve which swells out outward without any inflection point, although the position of the critical angle varies, a relation between the distance from the incidence plane 13 and the incidence angle exhibits similar tendency. An actual light source 23 radiates not only light rays parallel to the optical axis with respect to incidence plane 13. In addition, a radiation plane of the light source 23 is smaller than the area of the incidence plane 13, and the light source 23 has orientation properties such that light spreads in the shape of a conical beam of about 60 degrees. Therefore, each position on the counter surface 50 receives light rays of various incidence angle α.

Paths of Light Rays of Light Assembly

Figure 4:
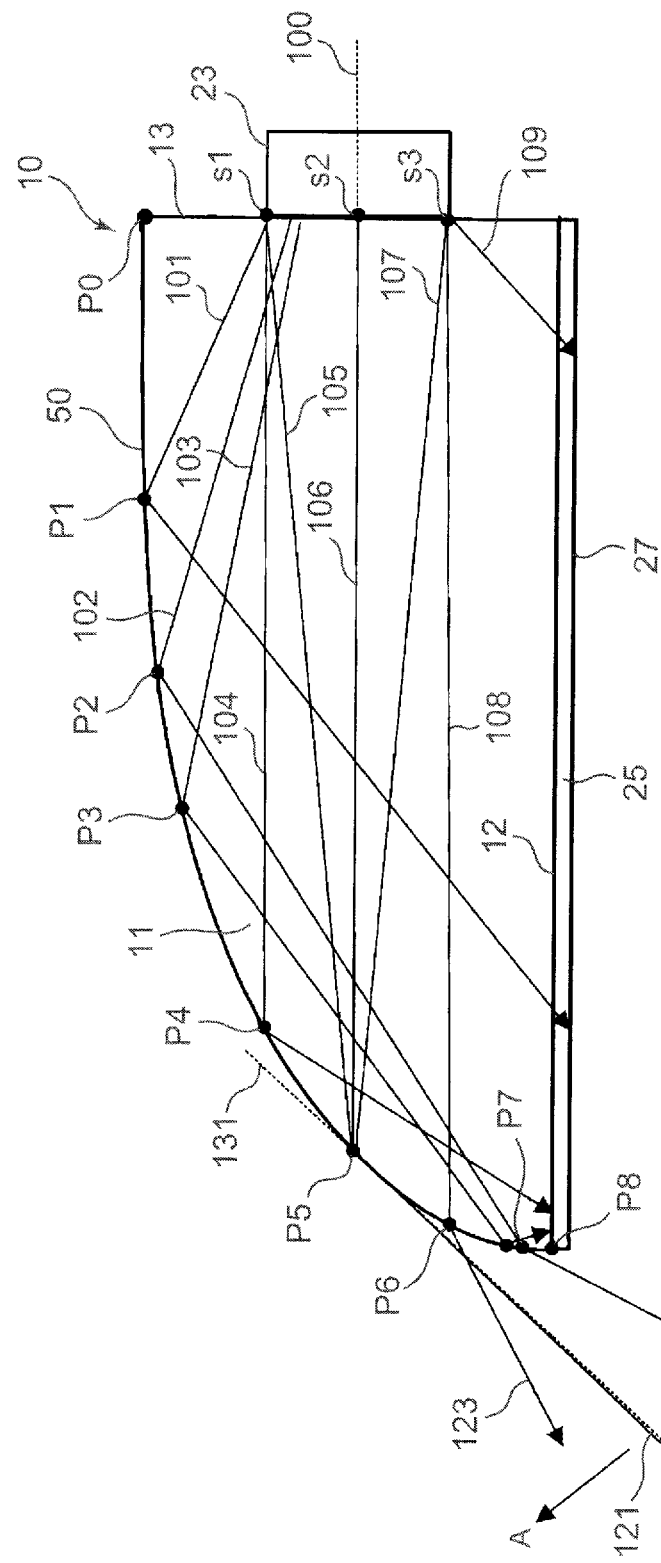
FIG. 4 is a view showing typical paths of light rays in the light assembly.

FIG. 4 is a view showing typical paths (optical paths) of light rays in the light assembly 10. FIG. 4 shows a cross section taken along the arrows A-A in FIG. 1, which cross section passes the optical axis 100 and is perpendicular to the bottom surface 12. Here, in one non-limiting example, a light guide having the size shown in FIG. 1, a headmost portion of the counter surface 50 is formed such that its cross section is in the form of an arc having a radius of 1.5 mm and a central angle of 60 degrees, and the other area of the counter surface 50 is formed in an arc having a radius of 9 mm and a central angle of 30 degrees. The light source 23 radiates a conical beam of light from a radiation plane perpendicular to the bottom surface 12 toward the incidence plane 13 with the spread at 60 degrees. In the figure, outermost rays of radiated light in an up-to-down direction are indicated by a light ray 101 and a light ray 109, and a range of the radiation plane of the light source 23 in the up-to-down direction is indicated by a position S1 and a position S3.

A light ray 106 travels over the optical axis 100 which runs through a center position S2 of the light source and which is perpendicular to the radiation plane. The incidence plane 13 and the radiation plane of the light source 23 are adjusted so that the optical axis 100 is parallel to the bottom surface 12. Further, the position of the height of the light source 23 is set so that the incidence angle of the light ray 106 with respect to a tangent 131 of a position P5 on the counter surface 50 at which the light ray 106 is incident corresponds to the critical angle.

In one example, a path of a direct ray is radiated from between the position S1 and the position S3 of the light source and then incident on the counter surface at the position P5. FIG. 4 shows typical light rays in this case as light rays 105, 106, and 107. A direct ray which is radiated from a position slightly toward the position S3 from the position S2 of the light source and incident at the position P5 passes therethrough at an incidence angle slightly smaller than the critical angle θm. As is apparent from FIG. 2C, the direct light is refracted at the largest refraction angle, and is emitted as a light ray 121. The direction of the light ray 121 to be emitted rotates slightly toward the right direction from the tangent 131. A direct ray which is radiated from between the position S2 and the position S3 of the light source and incident at the position P5 has a smaller incidence angle as its radiation position is closer to the position S3, and the light ray 121 is emitted in a direction rotating clockwise as shown in an arrow A around the position P5.

A direct ray radiated from a position that approaches the position S1 from the position S2 of the light source is totally reflected at a reflection angle approximate to the critical angle, and is incident on the bottom surface 12. A direct ray which is radiated from between the position S2 and the position S1 of the light source and incident at the position P5 has a larger incidence angle and a larger reflection angle as its radiation position is closer to the position S1. Thus, the direct ray is incident at that position on the bottom surface 12 which is close to a position P8 where the bottom surface 12 and the counter surface 50 have contact with each other. The light rays incident on the bottom surface 12 are mostly absorbed by the absorber layer 25, so that minimal total reflection occurs on the bottom surface 27.

Next will be explained paths of light rays which are radiated from between the position S1 and the position S3 of the light source and which are parallel to the optical axis 100. As presumable from FIG. 3A, a light ray which is radiated from between the position S1 and the position S2 of the light source and which is parallel to the optical axis 100 has an incidence angle which is beyond the critical angle. Therefore, the light ray is incident on the bottom surface 12 via primary total reflection between the position P4 and the position P5, or is incident on the bottom surface 12 via secondary total reflection on the headmost portion of the counter surface 50. FIG. 4 shows how a light ray 104 is incident on the bottom surface 12 via primary total reflection at the position P4. Light rays which are radiated from between the position S2 and the position S3 of the light source and which are parallel to the optical axis 100 have incidence angles smaller than the critical angle, so that they all pass through the counter surface 50.

A light ray which is radiated from a position close to position S3 from the position S2 of the light source and which is parallel to the optical axis 100 is incident on the counter surface 50 at the largest transmissive incidence angle and passes therethrough, and is refracted at the largest refraction angle, as is apparent from FIG. 2C. As the radiation position is closer to the position S3 or as the incident position is closer to a position P6, the incidence angle and the refraction angle become smaller, and respective light rays travel in directions apart from tangents at respective incident positions. FIG. 4 shows how a light ray 108 passes through the position P6 and is emitted as a light ray 123. The refraction angle of transmissive light continuously changes at each radiation position depending on its incidence angle at each incident position from the largest refraction angle to a refraction angle smaller than it only by a predetermined range.

Next will be explained a path of a representative direct ray which is radiated from the light source 23 and incident at a position on the counter surface except the area between the position P4 and the position P6. The light assembly 10 is set in an optical shape that causes a light ray 101 to be totally reflected at a position P1 on the counter surface 50. Thus, a range from the position P1 to a position P0, which is a position where the counter surface 50 and the incidence plane 13 have contact with each other does not function optically. Further, a light ray 109 is directly incident on the bottom surface 12, but is absorbed by the absorber layer 25 without total reflection on the bottom surface 12.

In this non-limiting example, every direct ray from the light source 23, which is incident on the counter surface between the positions P1 and P4 undergoes primary total reflection on the counter surface 50. FIG. 4 shows how the light ray 101 is incident on the bottom surface 12 via primary total reflection at the position P1, and how a light ray 102 is incident at and passes through a position P7 via primary total reflection at a position P2. The light ray 102 emitted through the position P7 travels toward a right direction (a direction approaching the light guide 11) with respect to a tangent 131 at the position P5. A light ray 103 undergoes primary total reflection at a position P3 and then secondary total reflection between the position P6 and the position P7, and is incident on the bottom surface 12. As such, reflected rays that have undergone primary total reflection between the position P1 and the position P4 include rays which enter and pass through between the position P6 and the position P8. However, among light rays that have undergone primary total reflection on the counter surface 50, almost all light rays which undergo secondary total reflection on the counter surface 50 are incident on the bottom surface 12, and are not emitted from the counter surface 50.

Direct rays which are radiated from the light source 23 and enter between the position P6 and the position P8 on the counter surface, in this example, undergo primary total reflection, and either enter the bottom surface 12 or pass therethrough. The direct rays which pass through between the position P6 and the position P8 include light rays, like the light ray 102, which are refracted in a direction (a direction approaching the light guide 11) rotating toward the left direction with respect to the tangent 131. Most of direct rays which are radiated from the light source 23 and are incident on the headmost portion of the counter surface 50 have refraction angles in a range of about 60 degrees from the largest refraction angle. Each of the rays is emitted by changing its direction from a direction that is approximately near a tangent at an incident position of each of the rays to a direction within a range about 30 degrees with respect to the tangent.

The above explanation is about the paths of the typical light rays of the light assembly 10. However, the first feature of the light assembly 10 is that the area formed of a curved surface between the position P5 on the optical axis 100 and the position P8 radiates light rays which have various paths and are incident thereon, by causing the light rays to pass therethrough and refracting them at refraction angles in a range of a predetermined refraction angle from the largest refraction angle. Note that the predetermined refraction angle can be set to a range from about 60 degrees to 45 degrees. The second feature is that light rays that are emitted from the reflecting surface 53 are suppressed by limiting total reflection on the bottom surface 12 by means of the absorber layer 25. The third feature is that an area of the counter surface 50 between the position P1 and the position P4 on the counter surface 50 causes light rays that are incident thereon to undergo primary total reflection so that a part of the light rays enter between the position P5 and the position P8 and pass therethrough.

The light guide 11 has a structure suitable for irradiation in a downward direction to the optical axis 100 or in a direction of the bottom surface 12 by use of that part of the counter surface 50 which is formed at a headmost portion thereof and which refracts incident light at a refraction angle in a range of around 60 degrees from the largest refraction angle. Further, the light guide 11 does not provide multiple total reflection between the counter surface 50 and the bottom surface 12. In view of this, the length L of the light guide does not have any optic limitation. Thus, in a case where it is not necessary to use light rays via primary total reflection from the counter surface 50 for illumination, the length L can be shortened to the physically possible range. In this way, the light assembly 10 has an advantageous structure particularly with a view to incorporation into small electronic devices.

First Illumination Structure

Figure 5:
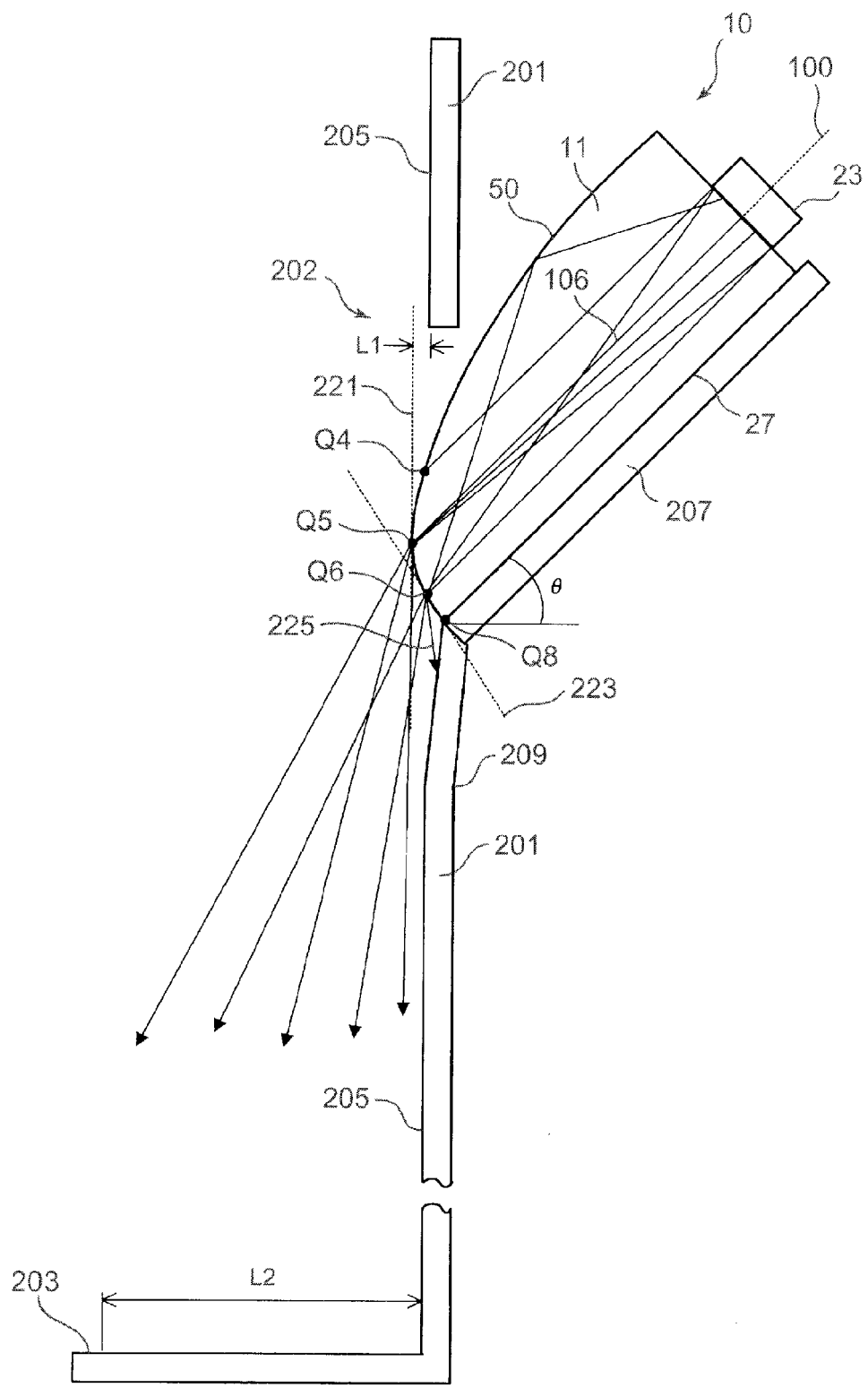
FIG. 5 is a cross-sectional view illustrating a first illumination structure in which a light assembly is attached to a wall, and that area of an irradiated surface which is near the wall is irradiated from an opening of the wall.

With reference to a cross-sectional view of FIG. 5, the following non-limiting example describes a first illumination structure in which the light assembly 10 is attached to a wall so as to irradiate that area of an irradiated surface 203 which is close to the wall. A wall 201 extends perpendicularly upward from the irradiated surface 203. A range where light assembly 10 irradiates is shown by a distance L2 from the wall. An area of the irradiated surface 203 within the range of the distance L2 from the wall is called a requested irradiation area. The light assembly 10 exhibits the same cross section as in FIG. 4. However, a position Q5 on the counter surface 50 at which a light ray 106 traveling over the optical axis 100 of the light source 23 is incident is a position which most projects from a mural surface 205. However, the position Q5 is slightly different from the position P5 in FIG. 4.

This difference is because, in order to effectively utilize light rays radiated from that radiation plane of the light source 23 which areally spreads, the optical axis 100 is inclined at a tilt angle θ to the mural surface 205 such that the tilt angle θ is set to 45 degrees, which is slightly larger than the critical angle θm (42 degrees). This will be explained later with reference to FIG. 12. Herein, the tilt angle θ refers to an angle with respect to the normal line of the mural surface 205.

In the wall 201, an opening 202 is formed at a position to which the light assembly 10 is fixed. The wall 201 is slightly inclined inward at a position 209 and has contact with an attachment section 207 that is further inclined at a tilt angle θ. In the light assembly 10, its bottom surface 27 is attached to the attachment section 207. In one non-limiting example of the first illumination structure the light assembly 10 is attached to the wall 201. On another example, the light assembly 10 may be attached without using the wall 201. Since the bottom surface 27 and the optical axis 100 are parallel, the optical axis 100 is accordingly inclined at the tilt angle θ with respect to the mural surface 205. The reason why the wall 201 is slightly inclined toward an inward direction of the wall at the position 209 is to effectively use light rays emitted from an emission surface formed in the headmost portion of the light guide 11 to illuminate the irradiated surface 203.

Further, the reason why the optical axis 100 is inclined with respect to the irradiated surface 203 is because the desired irradiation area on the irradiated surface 203 from a direction of a tangent 221 at the position Q5 to a direction within a range of around 30 degrees therefrom is irradiated with many light rays. A part of the headmost portion of the counter surface 50 projects slightly outward from the mural surface 205 through the opening 202. The position Q5 on the counter surface 50, at which the light ray 106 traveling over the optical axis 100 is incident, sets its position with respect to the incidence plane of the light source 23 so that the position Q5 mostly projects outward from the mural surface 205 in the counter surface. A space L1 between the position Q5 and the mural surface 205 is set to about 2 mm. The space L1 can be determined based on the illuminance required for that area of an effective irradiation area near the wall 201 and the luminance of the light source. The tangent 221 at the position Q5 is set to be parallel to the mural surface 205 or perpendicular to the irradiated area 203.

In this illumination structure, an area between the position Q5 and the position Q8 on the counter surface 50 is an emission surface which irradiates the desired irradiation area effectively. In an area between the position Q4 and the position Q5 on the counter surface 50, a part of light rays incident at positions whose respective tangents fall within the range of the distance L2 on the irradiated surface 203 can irradiate the desired irradiation area. Thus, between the position Q4 and the position Q5, that area of the counter surface 50 which is in vicinity to the position Q5 also serves as an emission surface.

Direct rays or reflected rays undergoing primary total reflection which have been incident on the representative positions Q5 and Q6 from the light source 23, which positions Q5 and Q6 are within the range of the emission surface, can irradiate the desired irradiation area such that they are emitted at refraction angles within a range of about 60 degrees from the largest refraction angle with respect to the tangent 221 or the tangent 223 depending on their incidence angles. Further, direct rays or the reflected rays which have been incident on the area between the position Q5 and the position Q8 include a light ray 225 that is emitted in a direction of the mural surface 205 from a tangent plane including the tangent 221 at the position Q5 which mostly projects from the emission surface.

Note that FIG. 5 shows a non-limiting example in which the light guide 11 and the light source 23 are provided inside the wall 201, and by use of the opening 202 which is formed on the wall, a part of the light guide 11 is placed outward from the mural surface 205. However, an embodiment is not limited to such a layout. For example, the light guide and the light source can be placed by using a notch formed in an end part of a wall or the light guide and the light source can be placed in a depression formed on a wall so that at least a partial area of the light guide projects from a mural surface.

Orientation Properties of Light Assembly

Figure 6:
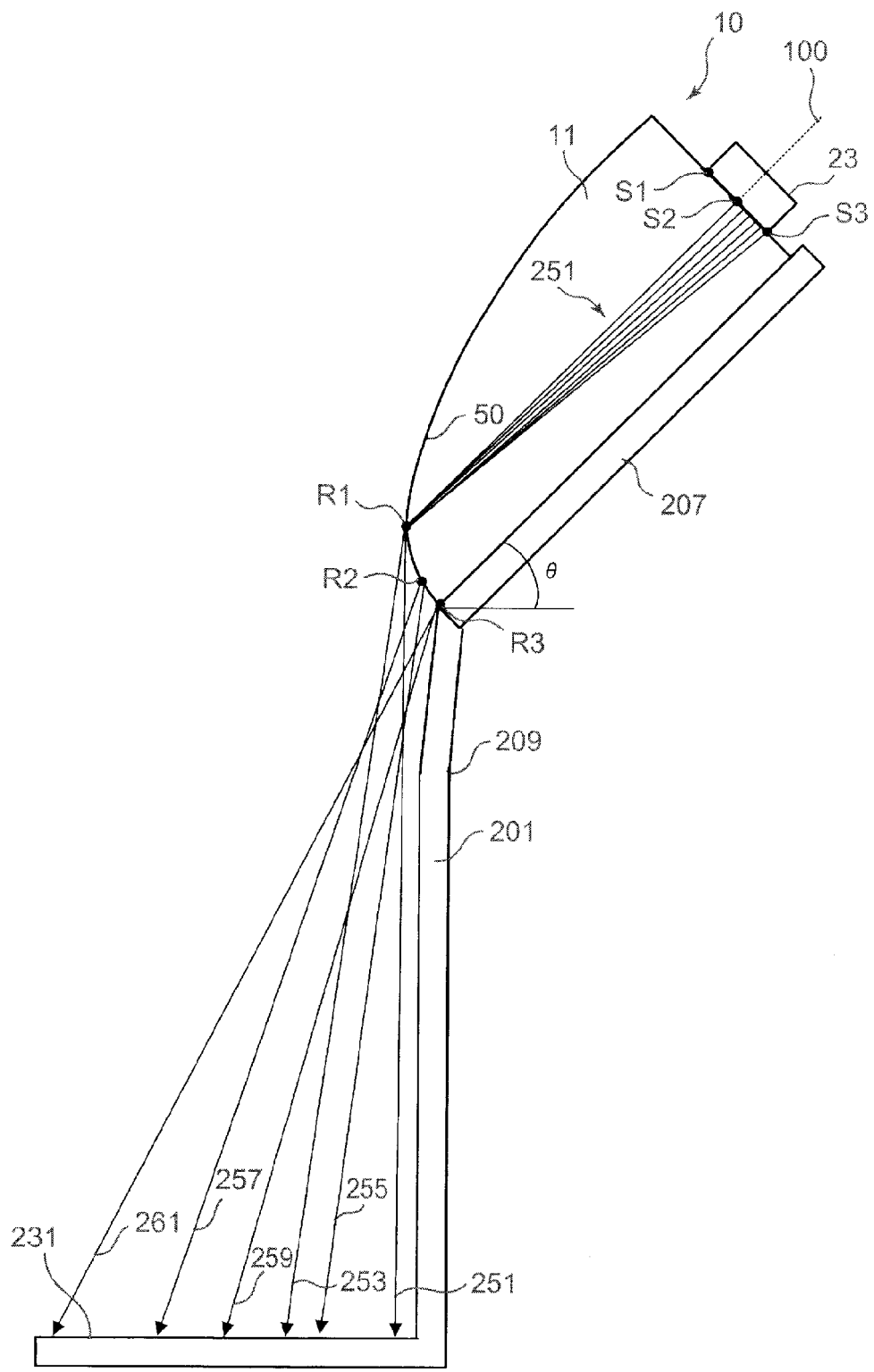
FIG. 6 is a view illustrating orientation properties of the light assembly.

FIG. 6 is a view illustrating orientation properties of the light assembly 10 shown in FIG. 4. As a non-limiting example, the following explains paths of direct rays radiated from a radiation plane ranging from a center position S2 to a position S3 of the light source 23 and then emitted from the counter surface 50. FIG. 6 shows a light-ray group 251 of direct rays radiated from positions on the radiation plane at equal intervals between the position S2 and the position S3. A light ray radiated from the position S2 of the light source and traveling over the optical axis 100 is emitted at the largest refraction angle from a position R1 on the counter surface 50, and irradiates that position on an irradiated surface 231 nearest to the wall 201.

The light-ray group 251 incident at the position R1 is emitted at refraction angles corresponding to respective incidence angles and illuminates an area defined by a range from a light ray 251 to a light ray 253, which is the area, on the irradiated surface 231, that is near the wall 201. A position R2 on the counter surface 50 gives incidence angles smaller than those at the position R1 to a light-ray group from the light source 23. Thus, at the position R2, it is possible to emit light rays radiated from a position close to the position S1 from the position S2 of the light source. The light-ray group of direct rays radiated from the light source 23 and incident at the position R2 illuminates an area, on the irradiated surface 231, which is defined by a range from a light ray 255 to a light ray 257.

A position R3 on the counter surface 50 gives incidence angles smaller than those at the position R2 to the light-ray group from the light source 23. Thus, at the position R3, it is possible to emit light rays radiated from a position closer to the position S1, as compared to the light rays incident at the position R2. The light-ray group of direct rays radiated from the light source 23 and incident at the position R3, in this example, illuminates an area, on the irradiated surface 231, which is defined by a range from a light ray 259 to a light ray 261 and which is the farthest area from the wall 201.

Since the counter surfaces 50 from the position R1 to the position R3 has a sectional shape formed of an arc, light rays incident at respective positions at different incidence angles are emitted such that the density of light rays is higher in a position near the wall 201 and is lower in a position farther from the wall 201. Thus, in the illumination structure of FIG. 5, the illuminance of the irradiated surface 231 is higher in the position near the wall 201 and is lower in the position farther from the wall 201. The illumination structure of FIG. 5 is effective to illuminate the irradiated surface 203 near the wall 201, but it may be necessary to remove the unevenness in illuminance in some cases. The light assembly 10 can be also applied to an illumination structure which can remove the illuminance unevenness of the irradiated surface 203. The following explains one non-limiting example of such a method.

Second Illumination Structure

Figure 7A:
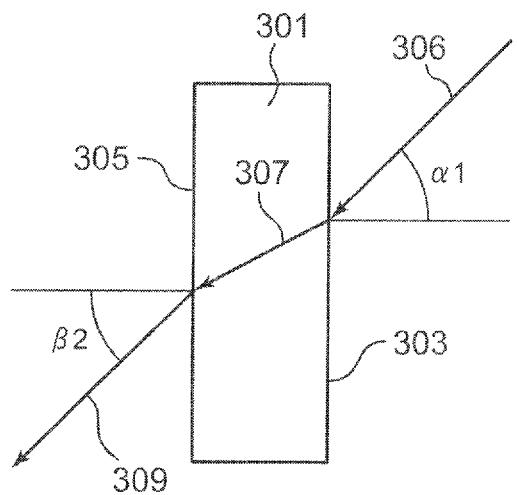
FIG. 7A-7B are views illustrating a property of a light ray passing through a permeable panel.

FIG. 7A is a view illustrating a state when a light ray incident on a transparent acrylic board is emitted. An acrylic board 301 includes an incidence plane 303 and an emission surface 305 each of which is flat. Incident light 306 is incident on the incidence plane 303 at an incidence angle $\alpha 1$ from the air, passes through the inside of the acrylic board 301 as transmissive light 307, and is emitted from the emission surface 305 as outgoing light 309 at a refraction angle $\beta 2$. The incidence angle $\alpha 1$ and the refraction angle $\beta 2$ are equal to each other. When the incidence angle $\alpha 1$ exceeds 0 degrees, the incident light 306 is parallel to the outgoing light 309, and when the incidence angle is 0 degrees, the incident light 306 and the outgoing light 309 travel over the same straight line.

Since the refractive index of acrylic is larger than the refractive index of air, total reflection does not occur on the incidence plane 303 regardless of the size of the incidence angle, so that all incident light enters the acrylic board 301. Further, since the incidence angle at which the transmissive light 307 is incident on the emission surface 305 is always smaller than the critical angle, total reflection does not occur on the emission surface 305. Assuming there is no absorption and scattering of light inside the acrylic board 301, the transmittance to be given as a ratio of the radiant exitance of the outgoing light 309 to the incident light 306 in a visible light area can be calculated by an expression of Fresnel reflection.

Figure 7B:
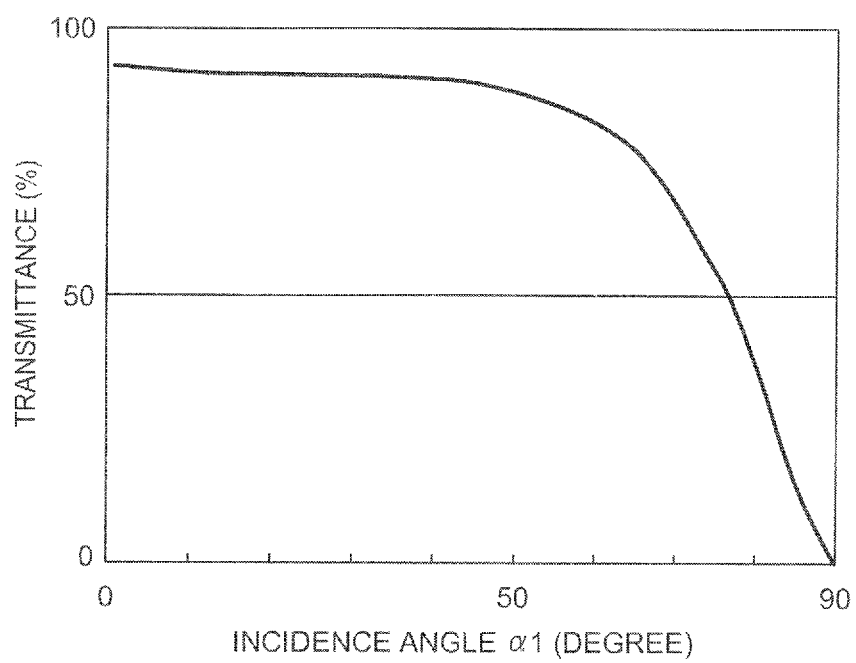

FIG. 7B is a view showing a transmittance of every incidence angle $\alpha 1$ of the outgoing light 309 to the incident light 306, which is calculated by the expression of Fresnel reflection. When the incidence angle $\alpha 1$ ranges from 0 degrees to around 50 degrees, the transmittance is around 92% and is almost constant. However, when the incidence angle exceeds 60 degrees, the transmittance suddenly falls, and it falls to around 20% at a transmittance of 85 degrees. This means that when a surface of the transparent acrylic board 301 is irradiated with a light ray at a large incidence angle, a light ray at a large refraction angle $\beta 2$ in accord with the large incidence angle is emitted from the emission surface 305, but the radiant exitance of the outgoing light is decreased, and in directions near the emission surface 305, a sufficient intensity of the illumination cannot be secured.

Figure 8:
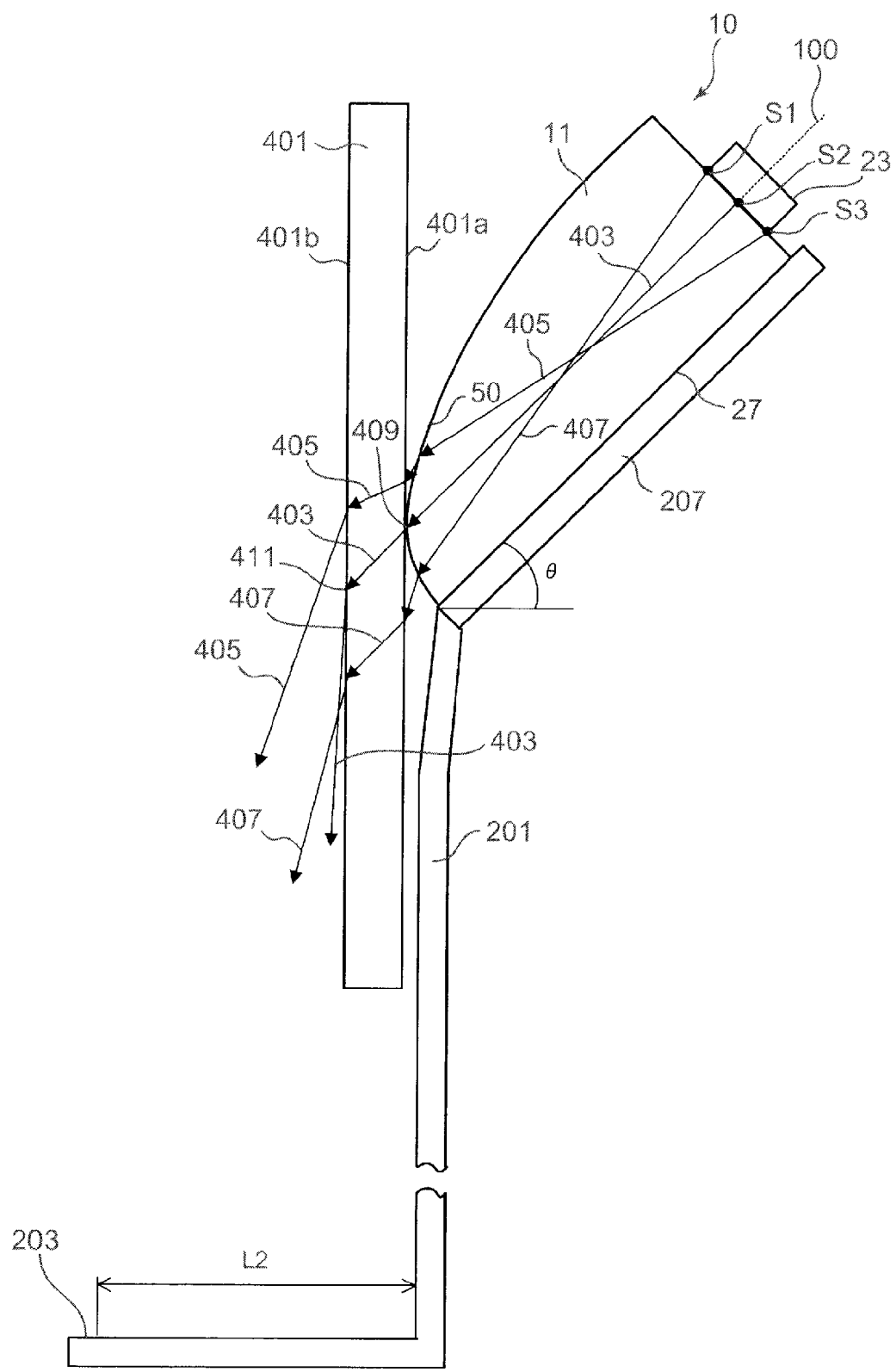
FIG. 8 is a cross-sectional view illustrating a second illumination structure in which a light assembly is located on a backside of an acrylic board so as to irradiate that area of an irradiated surface which is near the acrylic board.

FIG. 8 is a view illustrating a second illumination structure which solves this problem. The second illumination structure is configured such that, in the first illumination structure explained in FIG. 5, no opening 202 is formed but an optically-transparent flat acrylic board 401 is provided on the front of the light assembly 10 instead. The acrylic board 401 is placed perpendicular to the irradiated surface 203, and includes an incidence plane 401a on which light rays from the light source 23 are incident, and an emission surface 401b from which the light rays are emitted. Each of the incidence plane 401a and the emission surface 401b is formed flat. The thickness of the acrylic board 401 can be set to 1.2 millimeters as an example. Further, as an example, the acrylic board 401 is chosen so that its refractive index equals that of the light guide 11.

The optical axis 100 is inclined at a tilt angle $\theta$ with respect to the incidence plane 401a. The tilt angle $\theta$ is chosen so that a light ray 403 traveling over the optical axis 100 is emitted from the emission surface 51 at a refraction angle close to a largest refraction angle. The incidence plane 401a and the counter surface 50 are provided so as to have contact with each other at a position 409 on the incidence plane 401a at which position 409 the light ray 403 is incident. Since the refractive indexes of the acrylic board 401 and the light guide 11 are equal to each other, the light ray 403 travels in the acrylic board 401 without being refracted on the incidence plane 401a, and is emitted into the air from a position 411 on the emission surface 401b at a refraction angle close to the largest refraction angle. Since the light guide 11 does not have contact with the incidence plane 401a at any position other than the position 409, light rays to be emitted from positions except the position 409 on the counter surface 50 travel through the air once and are incident on the incidence plane 401a.

FIG. 8 shows paths of a light ray 407 radiated from a position S1 of the light source and a light ray 405 radiated from a position S3 of the light source. As has been described in FIG. 7A, the light ray incident on the incidence plane 401a is parallel to the light ray that is emitted from the emission surface 401b. Thus, light rays except the light ray incident from the position 409 are emitted into the air so that the density of light rays is higher as the position on the irradiated surface 231 is closer to the wall 201, as has been described in FIG. 6, and radiated from the radiation plane 401b with about the same orientation properties in FIG. 6. The light ray 403 that is incident from the position 409 is emitted from a position 411 that is lower than the position 409 by the thickness of the acrylic board 401. However, the direction of the outgoing light 403 is the same as the direction of a light ray to be directly emitted into the air from the counter surface 50.

Thus, the orientation properties of the light rays to be emitted from the acrylic board 401 are about the same as those in FIG. 6 as a whole, and they can be emitted at refraction angles within a range of about 60 degrees from the largest refraction angle and irradiate the desired irradiation area. Here, in view of the relation between the incidence angle $\alpha 1$ and the transmittance in FIG. 7B, the transmittance is smaller as the incidence angle $\alpha 1$ is larger. This property works on a light ray that is refracted at a large refractive index in the light guide 11 and further passes through the acrylic board 401 to be emitted at a large refractive index in such a manner that it offsets the unevenness in illuminance of the irradiated surface 203 and uniforms the illuminance of an area, on the irradiated surface 203, corresponding to a distance from a position on the wall 201.

Figure 9:
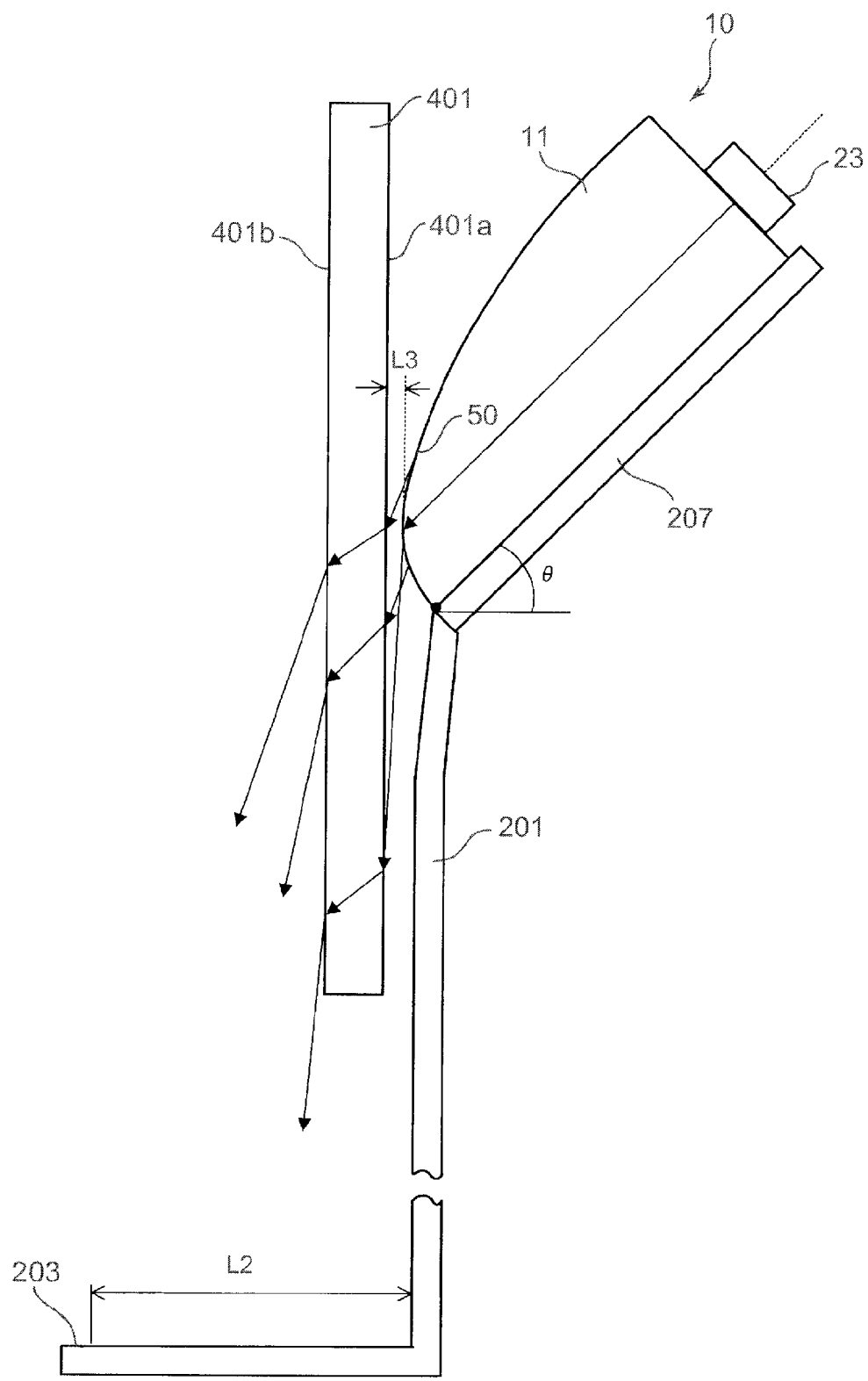
FIG. 9 is a cross-sectional view illustrating the second illumination structure in which a light assembly is located on a backside of an acrylic board so as to irradiate area of an irradiated surface which is near the acrylic board.

In FIG. 8, a part of the light guide 11 is located so as to have contact with the incidence plane 401a. However, the headmost portion of the light guide 11 and the incidence plane 401a may be placed so that they are separated by a space L3 as shown in FIG. 9. In this case, all light rays emitted from the counter surface 50 are incident on the incidence plane 401a after traveling downward in the air. An incident position is lower as the space between the light guide 11 and the incidence plane 401a is larger. However, the orientation properties of the light rays emitted from the emission surface 401b are about the same as those when they have contact with each other.

Example Application of Light Assembly

Figure 10:
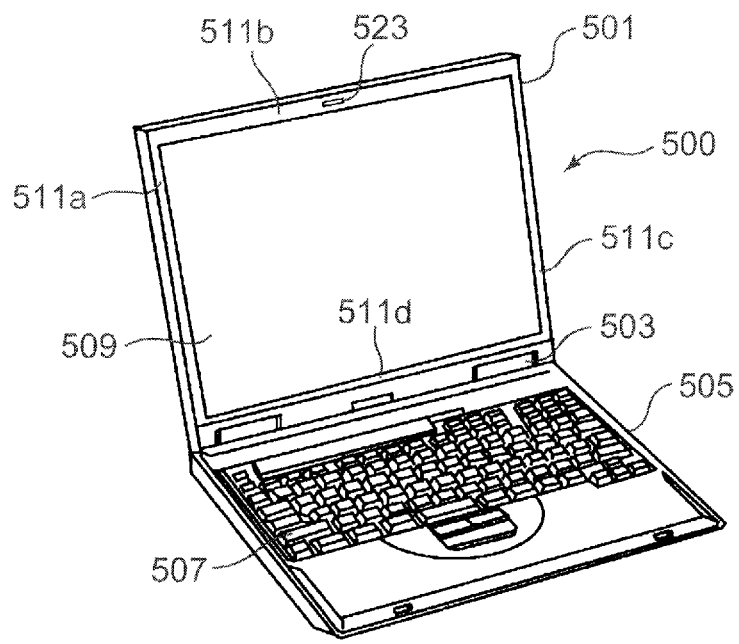
FIG. 10 is a view illustrating an example in which a light assembly is applied to a keyboard light.

FIG. 10 is a view illustrating an example in which the light assembly 10 is applied to a laptop PC. A laptop PC 500 is configured such that a display housing 501 is supported by being combined with a system housing 505 by a hinge 503, so that the laptop PC 500 can be opened and closed. The display housing 501 houses a liquid crystal display device (LCD) 509 therein. A keyboard 507 is mounted on a surface of the system housing 505. The periphery of the LCD 509 is surrounded by frames 511a to 511d. The frames 511a to 511d serve to hide a space between the LCD 509 and the display housing 501. A surface, on a side of the LCD 509, of the display housing 501 is covered with a single flat, transparent acrylic board 521 (see FIG. 11).

Figure 11:
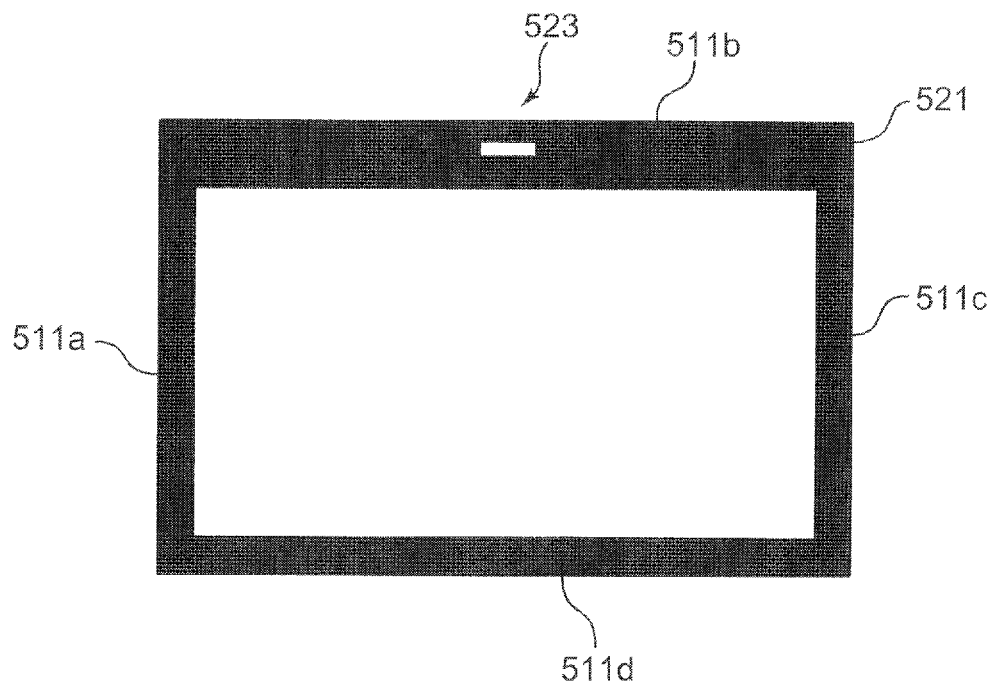
FIG. 11 is a view illustrating a configuration of an acrylic board covering a front surface of a display housing.

FIG. 11 is a plane view of the acrylic board 521 covering the surface of the display housing 501. The acrylic board 521 is a thin plate having a thickness of 1.2 millimeters. On the acrylic board 521, an area corresponding to the frames 511a to 511d is screen-printed by black ink. Further, an area which is not screen-printed is provided partially in a central portion of the frame 511b, so that a window 523 is formed therein. The window 523 corresponds to the acrylic board 401 of the second illumination structure explained in FIG. 8 and FIG. 9. The size of the window 523 is set to 12 millimeters×6 millimeters, for example. On a backside of the window 523, the light assembly 10 is attached to the display housing 501. The light assembly 10 may be attached to the acrylic board 521, alternatively.

The light assembly 10 is attached so that an optical axis is inclined at a tilt angle θ with respect to a normal line to a rear surface of the acrylic board 521. In the light assembly 10, since the light guide 11 is provided on the backside of the acrylic board 11, it is possible to design the surface of the acrylic board 521 to be formed of a completely flat plane. Further, in a state where the display housing 501 is opened, a light ray emitted from the emission surface 51 of the light assembly 10 passes through the window 523, so that the light ray can irradiate the keyboard 507. Thus, the illuminance on the keyboard 507 is uniform over all.

Determination Method of Tilt Angle θ

Figure 12A:
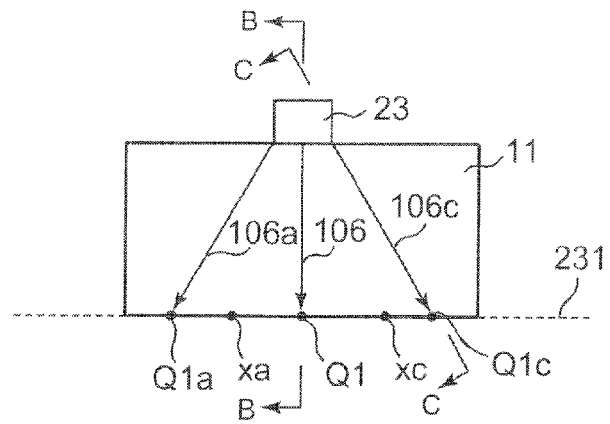
FIG. 12A-12C are views illustrating a method of determining a tilt angle of a light axis.
Figure 12B:
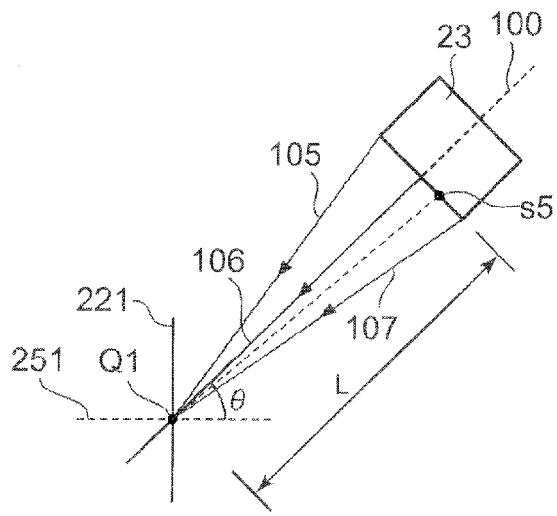
Figure 12C:
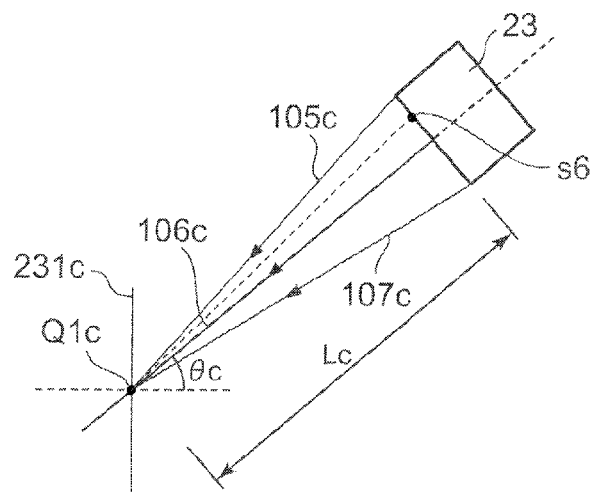

Referring to FIG. 12, it is explained why, in the first illumination structure and the second illumination structure, the tilt angle θ of the optical axis 100 with respect to the irradiated surface 203 is set to 45 degrees, which is 3 degrees larger than the critical angle. FIG. 12A shows a cross section of the light assembly 10 on a plane which is parallel to the bottom surface and which includes the optical axis. A line 231 is formed by cutting a tangent plane 231 including the tangent 221 in FIG. 5. FIG. 12B is a cross-sectional view taken along arrows B-B in FIG. 12A, in which view the light assembly 10 is cut on a plane which is perpendicular to the bottom surface and which includes the optical axis. FIG. 12C is a cross-sectional view taken along arrows C-C in FIG. 12A, in which view the light assembly 10 is cut on a plane which is perpendicular to the bottom surface and which includes a light ray 106c. Light rays 106a, 106, and 106c travel over the same plane in FIG. 12A, and are respectively incident at those positions Q1a, Q1, and Q1c, on the counter surface, which have contact with the tangent plane 231.

FIG. 12C shows a state in which a tangent 231c cuts the tangent plane 231, and it rotates slightly toward a left direction from the tangent 221 which cuts the tangent plane 231 in FIG. 12B. In other words, at the position Q1c on the counter surface, an incidence angle θc of the light ray 106c which travels over a plane which includes the optical axis and which is parallel to the bottom surface is smaller than an incidence angle θ of the light ray 106 which travels over the optical axis and is incident at the position Q1 on the counter surface. The same is true to the position Q1a at which the light ray 106a is incident.

In FIG. 12B, an angle to a normal line 251 of the tangent 221 corresponds to a tilt angle θ of 45 degrees. In view of this, the light ray which travels over the optical axis 100 undergoes primary total reflection at the position Q1 on the counter surface, so that the light ray cannot be used effectively. However, the radiation plane of the light source 23 areally spreads in an up-to-down direction, and therefore, the light ray 105 and the light ray 107 are each inclined at around 8 degrees with respect to the optical axis 100. In view of this, assuming that a light ray radiated from a position S5 on the radiation plane is emitted from the position Q1 on the counter surface at the largest refraction angle, all light rays radiated from positions lower than the position S5 are emitted from the position Q1.

In contrast, at the position Q1c, at which the light ray 106c is incident on the tangent plane 231, the incidence angle θc of the light ray 106c is smaller than the tilt angle θ by about 5 degrees. In view of this, assuming that a light ray radiated from a position S6 on the radiation plane is emitted from the position Q1c on the counter surface at the largest refraction angle, all light rays radiated from positions lower than the position S6 on the radiation plane are emitted from the position Q1c. Light rays to the position Q1a are also emitted in a similar manner to the above. Therefore, among light rays that are incident at any positions on the counter surface which positions have contact with the tangent plane 231 including the positions Q1a, Q1, and Q1c, light rays incident on an area between Xa and Xc, which sandwich the position Q1 on the optical axis on the plane of FIG. 12A, do not pass through the counter surface.

However, since light rays radiated from radiation positions in a lower direction than the optical axis and which enter between the position Q1a and the position Xa or between the position Q1c and the position Xc pass, the availability ratio of light rays radiated from the whole light source is high. When the tilt angle θ is set to 45 degrees, an amount of the light rays that are emitted substantially in parallel to the tangent 221 can be increased, thereby making it possible to increase incidence efficiency of light rays illuminating the area near the wall 201. Note that the tilt angle θ can be chosen within a range from 42 degrees, which is the critical angle, to 45 degrees.

Other Examples of Light Guide

FIG. 13 is cross-sectional views showing other examples of the cross-sectional shape of the light guide. Any of FIG. 13A to FIG. 13D show a cross section at a position corresponding to the arrows A-A in FIG. 1, and further it is assumed that a bottom surface include s an absorber layer. In a light guide in FIG. 13A, a counter surface 501 includes a planar emission surface 503 ranging from a position T1 to a position T3, and a reflecting surface 505 formed with a cubic curve or an arc having a predetermined radius and central angle.

The tilt of the emission surface 503 to an optical axis of a light source 23 is set so that a light ray 507 traveling over the optical axis is incident on the emission surface 503 at a position T2 at the critical angle. In this case, light rays radiated parallel to the optical axis from between a position S1 and a position S3 on the light source do not pass through the emission surface 503, but light rays incident on the emission surface 503 at angles smaller than the critical angle pass therethrough. The refraction angle is determined depending on an incident position on the emission surface 503 and a radiation position on the light source. However, when the refraction angle is an angle in a predetermined range from the largest refraction angle, it is possible to obtain outgoing light of refraction angles which are dispersed uniformly.

However, in this case, a light ray that undergoes primary total reflection on the reflecting surface 505 and is incident on the emission surface 503 undergoes secondary total reflection on the emission surface 503 and thereby is incident on a bottom surface 509. In view of this, the availability ratio of light radiated from the light source 23 decreases. In order to compensate for this, as shown by a dotted line, a plane which is perpendicular to the bottom surface 509 can be formed at the position T2. Further, when the emission surface 503 is formed of adjacent planes that incline at various angles with respect to the optical axis, it arrives at the shape of FIG. 4, which is the most effective.

Figure 13A:
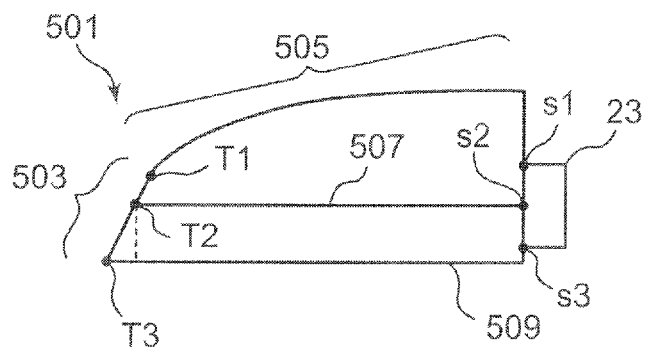
FIG. 13A-13D are views showing other examples of the cross-sectional shape of the light guide.
Figure 13B:
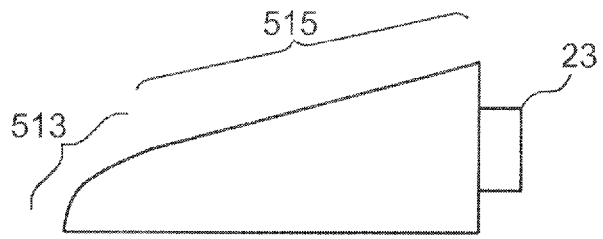
Figure 13C:
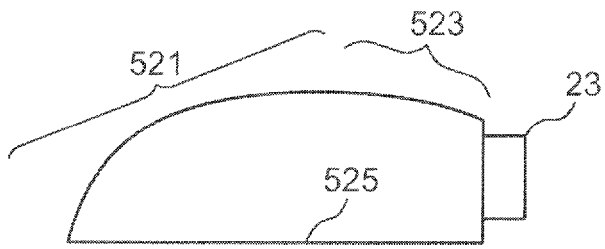
Figure 13D:
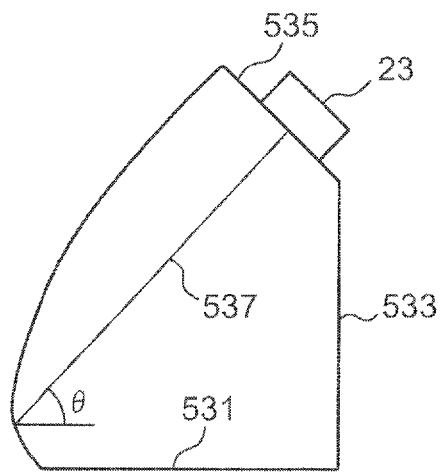

FIG. 13B shows an example in which an emission surface 513 is formed in the same shape as the emission surface of FIG. 4, and a reflecting surface 515 is formed in a planar shape. In FIG. 13C, an area 521 of a counter surface including an emission surface is in the same shape as in FIG. 4, but an area 523 which is near a light source curves toward a side of a bottom surface 525 as it approaches the light source. The area 523 is arranged such that an incidence angle and a reflection angle of incident light are made large so that as many light rays having undergone primary total reflection as possible can be incident on the emission surface. FIG. 13D shows an example in which when a light assembly is attached with an optical axis 537 inclined at a tilt angle θ, the light assembly can be attached without inclining a light guide itself. In FIG. 13D, the light assembly is constituted by a plane 531 that crosses the optical axis at a tilt angle θ, and an area 533 that contacts the plane 531 and an incidence plane 535.

In the above explanation, embodiments are described with particular characteristics shown in drawings. However, the disclosure is not limited to these embodiments shown in the drawings, and as far as the advantageous effects described can be achieved, other embodiments can adopt any configuration that has been known until now. If not otherwise stated herein, it is to be assumed that all patents, patent applications, patent publications and other publications (including web-based publications) mentioned and cited herein are hereby fully incorporated by reference herein as if set forth in their entirety herein.

Embodiments have been described with reference to specific examples illustrated in the drawings. However, these are simply non-limiting examples, and of course, so long as the effects are obtained, any kind of well known configuration can be employed.

What is claimed is:

1. An apparatus comprising:
    an upper housing having a display screen and an illumination structure therein; and
    a lower housing attached to said upper housing and having information handling device components therein;
    said illumination structure comprising:
        a light source; and
        a flat optically-transparent panel structure;
    wherein said light source is positioned to provide light rays to said flat optically-transparent panel structure such that said light rays are refracted and emit from said flat optically-transparent panel structure onto a surface of said lower housing.

2. The apparatus of claim 1, wherein said optically-transparent panel structure includes a front surface and a rear surface, each of which is substantially flat and wherein said light rays are refracted and directly emit from said flat optically-transparent panel structure onto a surface of said lower housing.

3. The apparatus of claim 2, said light source provides said light rays at a tilt angle that is within a predetermined range of a critical angle with respect to the rear surface of the optically-transparent panel structure.

4. The apparatus of claim 3, wherein said illumination structure further comprises a light guide provided between the light source and the rear surface of the optically-transparent panel structure.

5. The apparatus of claim 4, wherein said light rays from the light source are refracted by passing through the light guide and the optically-transparent panel structure so as to pass from the front surface onto said lower surface.

6. The apparatus of claim 3, wherein the tilt angle is in a range from the critical angle to an angle larger than the critical angle by 3 degrees.

7. The apparatus of claim 1, wherein light rays emitted from the optically-transparent panel structure are refracted in a range of 60 degrees from a largest refraction angle.

8. The apparatus of claim 5, wherein the light guide has an incidence plane on which the light rays from the light source are incident, an emission surface provided at a position opposed to the incidence plane, and further wherein some of the light rays are refracted at a largest refraction angle and incident on the optically-transparent panel structure.

9. The apparatus of claim 3, wherein the light guide comprises:
    a flat bottom surface which has contact with an incidence plane and an emission surface and which provides a mounting surface, and
    a reflecting surface which:
        has contact with the incidence plane and the emission surface;
        is provided at a position opposed to the flat bottom surface;
        whose cross section on a plane including an optical axis and perpendicular to the flat bottom surface is formed in a curve; and
        causes light rays directly incident thereon from the light source to be totally reflected so as to be incident on the emission surface.

10. The apparatus of claim 9, wherein a cross section of the emission surface is formed in a cubic curve or an arc.

11. The apparatus of claim 10, wherein a light ray traveling over the optical axis of the light source is incident at a nearest position on the emission surface relative to the rear surface.

12. The apparatus of claim 11, wherein the nearest position on the emission surface relative to the rear surface is in contact with the rear surface.

13. The apparatus of claim 9, further comprising:
    an absorber layer which is provided so as to adhere to the flat bottom surface, which restrains total reflection on the flat bottom surface, and which absorbs incident light.

14. The apparatus of claim 13, wherein the absorber layer is formed of black ink applied to the flat bottom surface by screen printing.

15. The apparatus of claim 1, wherein when the upper housing is opened to be approximately perpendicular to the lower housing, light rays radiated from the light source are refracted by passing through the at least the optically-transparent panel so as to irradiate a keyboard portion of said lower housing.

16. An apparatus comprising:
    an illumination structure configured for integration within an upper housing of an information handling device;
    said illumination structure comprising:
        a light source; and
        a flat optically-transparent panel structure;

wherein said light source is positioned to provide light rays to said flat optically-transparent panel structure such that said light rays are refracted and emit from said flat optically-transparent panel structure onto a surface of a lower housing of said information handling device.

17. The apparatus of claim 16, wherein said optically-transparent panel structure includes a front surface and a rear surface, each of which is substantially flat.

18. The apparatus of claim 16, wherein when the upper housing is opened to be approximately perpendicular to the lower housing, light rays radiated from the light source are refracted by passing through the at least the optically-transparent panel so as to irradiate a keyboard portion of said lower housing.

19. A method comprising:
   providing a flat optically-transparent panel structure in an upper housing of an information handling device; and
   providing a light source which is set so to provide light rays to a rear surface of the optically-transparent panel structure;
   wherein, said providing a flat optically-transparent panel structure and said providing a light source steps include arranging said light source and said flat optically-transparent panel structure such that light rays emitted from said light source are refracted and emitted from said flat optically-transparent panel structure onto a surface of a lower housing of said information handling device.

20. The method of claim 19, wherein when the upper housing is opened to be approximately perpendicular to the lower housing, light rays radiated from the light source are refracted by passing through the at least the optically-transparent panel so as to irradiate a keyboard portion of said lower housing.

\* \* \* \* \*